United States Patent
Nitta et al.

(10) Patent No.: US 10,547,690 B2
(45) Date of Patent: Jan. 28, 2020

(54) CONNECTION DESTINATION SERVER INSTRUCTION APPARATUS, SERVICE USE SYSTEM, CLIENT TERMINAL, CONNECTION DESTINATION SERVER INSTRUCTION METHOD, AND PROGRAM

(71) Applicant: NTT Communications Corporation, Chiyoda-ku (JP)

(72) Inventors: Masashi Nitta, Kawasaki (JP); Akira Sei, Setagaya-ku (JP)

(73) Assignee: NTT Communications Corporation, Chiyoda-ku (JP)

( * ) Notice: Subject to any disclaimer, the term of this patent is extended or adjusted under 35 U.S.C. 154(b) by 71 days.

(21) Appl. No.: 15/576,780

(22) PCT Filed: Mar. 10, 2016

(86) PCT No.: PCT/JP2016/057617
§ 371 (c)(1),
(2) Date: Nov. 24, 2017

(87) PCT Pub. No.: WO2016/189928
PCT Pub. Date: Dec. 1, 2016

(65) Prior Publication Data
US 2018/0309834 A1    Oct. 25, 2018

(30) Foreign Application Priority Data

May 26, 2015    (JP) ................. 2015-106718

(51) Int. Cl.
*H04L 29/08* (2006.01)
*H04L 29/06* (2006.01)

(52) U.S. Cl.
CPC ............ *H04L 67/141* (2013.01); *H04L 67/42* (2013.01)

(58) Field of Classification Search
USPC ................. 709/217, 223, 227, 228
See application file for complete search history.

(56) References Cited

U.S. PATENT DOCUMENTS

| 2002/0103885 | A1 | 8/2002 | Hamada |
| 2012/0078851 | A1 | 3/2012 | Pinault |
| 2012/0089671 | A1* | 4/2012 | Averbuj ............. H04L 45/306 709/203 |

FOREIGN PATENT DOCUMENTS

| EP | 2 365 675 A1 | 9/2011 |
| JP | 09-198346 | 7/1997 |

(Continued)

OTHER PUBLICATIONS

International Search Report dated Apr. 12, 2016 in PCT/JP2016/057617 Filed Mar. 10, 2016.

(Continued)

*Primary Examiner* — Chirag R Patel
*Assistant Examiner* — Marshall M McLeod
(74) *Attorney, Agent, or Firm* — Oblon, McClelland, Maier & Neustadt, L.L.P.

(57) ABSTRACT

A connection destination server instruction apparatus for causing a client terminal to connect to a specific sever in a plurality of servers, including: parameter acquisition means configured to acquire a server parameter on each server; area name acquisition means configured to acquire an area name of a location of the client terminal based on a connection request; connection destination determination means configured, when an area indicated by the area name belongs to a specific area, to regard one or more servers placed in the specific area in the plurality of servers to be candidates of the specific server, and to determine the specific server from the one or more servers that are the candidates by using the server parameter acquired by the parameter acquisition (Continued)

means; and connection destination instruction means configured to transmit, to the client terminal, information of the specific server.

6 Claims, 12 Drawing Sheets

(56) References Cited

FOREIGN PATENT DOCUMENTS

| JP | 2003-6354 | 1/2003 |
|---|---|---|
| JP | 2003-167810 | 6/2003 |
| JP | 2005-4243 | 1/2005 |
| JP | 2008-217302 | 9/2008 |
| JP | 2010-268368 | 11/2010 |
| JP | 2012-527670 | 11/2012 |
| JP | 2013-171371 | 9/2013 |
| JP | 2014-056335 | 3/2014 |

OTHER PUBLICATIONS

Japanese Office Action dated Apr. 12, 2016 in JP Application No. 2015-106718 Filed May 26, 2015.
Japanese Office Action dated Aug. 30, 2016 in JP Application No. 2015-106718 Filed May 26, 2015.
Japanese Office Action dated Jan. 17, 2017 in JP Application No. 2015-106718 Filed May 26, 2015.
Japanese Office Action dated Jun. 27, 2017 in JP Application No. 2015-106718 Filed May 26, 2015.
Extended European Search Report dated Dec. 13. 2018 in Patent Application No. 16799637.0.

* cited by examiner

FIG.4

| | | US-1 | US-2 | UK | JP | CN | SG | DE-1 | DE-2 |
|---|---|---|---|---|---|---|---|---|---|
| SERVER PARAMETER | NUMBER OF CONNECTIONS | 80 | 80 | 80 | 50 | 80 | 100 | 80 | 80 |
| | CPU | 80 | 80 | 80 | 50 | 80 | 100 | 80 | 80 |
| | MEMORY | 80 | 80 | 80 | 50 | 80 | 100 | 80 | 80 |
| | NW USAGE RATE | 80 | 80 | 50 | 50 | 100 | 100 | 80 | 80 |
| | SERVER REDUNDANCY | 50 | 50 | 100 | 100 | 100 | 100 | 50 | 50 |
| | SERVER SPEC | 100 | 100 | 50 | 50 | 100 | 100 | 100 | 100 |
| | REGIONAL RISK (DC QUALITY, DISASTER, NE QUALITY AND THE LIKE) | 50 | 50 | 50 | 50 | 100 | 60 | 50 | 50 |
| CORRE-LATION WITH TERMINAL | BROWSER | 50 | 50 | 50 | 50 | 50 | 50 | 50 | 50 |
| | DISTANCE | 200 | 200 | 200 | 100 | 100 | 50 | 200 | 200 |
| | NUMBER OF HOPS | 200 | 200 | 200 | 100 | 100 | 80 | 200 | 200 |
| | AVAILABILITY OF CROSS-BORDER | ○ | ○ | ○ | Group1 | ○ | ○ | Group2 | Group2 |

A (JP column indicated)

| ACCESS SOURCE | TARGET COUNTRY | TARGET SERVER |
|---|---|---|
| GERMANY | GERMANY | DE1, 2, 3 |
| UK | GERMANY, UK | DE1, 2, 3 |
| | | UK1, 2, 3 |
| JAPAN | JAPAN | JP1, 2 |

| NUMBER OF CONNECTIONS | SCORE |
|---|---|
| ~100 | 50 |
| ~500 | 100 |
| ~1000 | 200 |
| ... | ... |

FIG.9A

| TOTAL VALUE OF NUMBER OF HOPS | SCORE |
|---|---|
| 1~5 | 50 |
| 5~10 | 100 |
| ... | ... |

SCORE OF NUMBER OF HOPS IN
END TO END FROM CLIENT TO SERVER

FIG.9B

| ARRIVAL TIME | SCORE |
|---|---|
| 1-100 msec | 50 |
| 100-250 msec | 100 |
| ... | ... |

SCORE OF ARRIVAL TIME IN
END TO END FROM CLIENT TO SERVER

FIG.10A

| USING BROWSER OF CLIENT | SITE | SCORE |
|---|---|---|
| JP | JP | 50 |
| CN | CN | 50 |
| | SG | 100 |
| | UK | 100 |
| | US | 100 |
| | JP | 200 |
| EN | UK | 50 |
| | US | 50 |
| | JP | 50 |
| | SG | 50 |

CLIENT INFORMATION AND SCORE OF SITE

FIG.10B

| DISTANCE | SITE | SCORE |
|---|---|---|
| CN | CN | 50 |
| JP | JP | 50 |
| | CN | 100 |
| SG | SG | 50 |
| | JP | 100 |
| | CN | 100 |
| | UK | 200 |
| | US | 200 |

DISTANCE AND SCORE

FIG.11A

| TARGET SERVER | SCORE |
|---|---|
| US1 | 50 |
| US2 | 50 |
| UK | 50 |
| JP | 50 |
| CN | 100 |
| SG | 100 |
| DE1 | 50 |
| DE2 | 50 |
| ... | 60 |
| ... | 70 |

SERVER REDUNDANCY

FIG.11B

| TARGET SERVER | SCORE |
|---|---|
| US1 | 100 |
| US2 | 100 |
| UK | 100 |
| JP | 100 |
| CN | 100 |
| SG | 100 |
| DE1 | 100 |
| DE2 | 100 |
| ... | 50 |
| ... | 50 |

SERVER SPEC

FIG.11C

| TARGET SERVER | SCORE |
|---|---|
| US1 | 50 |
| US2 | 50 |
| UK | 50 |
| JP | 50 |
| CN | 100 |
| SG | 60 |
| DE1 | 50 |
| DE2 | 50 |
| ... | 50 |
| ... | 50 |

REGIONAL RISK

CONNECTION DESTINATION SERVER INSTRUCTION APPARATUS, SERVICE USE SYSTEM, CLIENT TERMINAL, CONNECTION DESTINATION SERVER INSTRUCTION METHOD, AND PROGRAM

TECHNICAL FIELD

The present invention relates to a technique for causing a client terminal to connect to a specific server in a service providing system including a plurality of servers.

BACKGROUND ART

In recent years, a service providing system has been introduced in which servers are installed at a plurality of sites in the world to provide services to users. As an example of such a service providing system, there is an MSS (Managed Security Service) providing system. In the MSS, as an example, there is provided a service for detecting unknown attacks by collecting and analyzing log information of various servers that users use.

In the service providing system including servers at a plurality of sites in the world like the MSS providing system, a user receives a service by accessing a server serving as a customer portal site from a client terminal.

RELATED ART DOCUMENT

Patent Document

Patent Document 1 JP2013-171371

SUMMARY OF THE INVENTION

Problem to be Solved by the Invention

In the service providing system like the MSS providing system, databases (DB) for providing services are centrally managed by a technique such as distributed DB and the like, so that a user can receive the same service regardless of sites of servers which the user accesses.

In such a service, generally, the user himself/herself designates a domain of a specific site to connect to the server of the site. However, in the scheme in which the user himself/herself designates the site of the connection destination, there are cases in which accesses are concentrated to a specific server, and the user cannot access an optimal server in view of the quality of the server/MW and regional circumstances of the site. Also, depending on circumstances of countries of each site and the like, it may be necessary to restrict servers to which a client terminal connects according to locations of the client terminal. However, in the conventional technique, it is difficult to respond appropriately to the necessity of such restriction.

The present invention is contrived in view of the above-mentioned points, and an object of the present invention is to provide a technique that makes it possible to determine a proper server as a connection destination of a client terminal from a plurality of servers that provide services, and to cause the client terminal to connect to the proper server.

Means for Solving the Problem

According to an embodiment of the present invention, there is provided a connection destination server instruction apparatus for causing a client terminal that uses a service of a service providing system including a plurality of servers to connect to a specific sever in the plurality of servers, including:

parameter acquisition means configured to acquire a server parameter on each server of the plurality of servers;

area name acquisition means configured to acquire an area name of a location of the client terminal based on a connection request received from the client terminal;

connection destination determination means configured, when an area indicated by the area name belongs to a specific area, to regard one or more servers placed in the specific area in the plurality of servers to be candidates of the specific server, and to determine the specific server from the one or more servers that are the candidates by using the server parameter acquired by the parameter acquisition means; and connection destination instruction means configured to transmit, to the client terminal, information of the specific server determined by the connection destination determination means.

According to an embodiment of the present invention, there is provided a client terminal in a service use system including a connection destination server instruction apparatus for causing a client terminal that uses a service of a service providing system including a plurality of servers to connect to a specific sever in the plurality of servers, and the client terminal, including terminal parameter acquisition means configured to acquire a terminal parameter that is information on a route between the client terminal and each server;

parameter notification means configured to notify the connection destination server instruction apparatus of the terminal parameter;

connection request means configured to transmit a connection request to the connection destination server instruction apparatus; and reception means configured to receive information of the specific server that is determined from the plurality of servers by using the terminal parameter in the connection destination server instruction apparatus that receives the connection request.

According to an embodiment of the present invention, there is provided a connection destination server instruction method executed by a connection destination server instruction apparatus for causing a client terminal that uses a service of a service providing system including a plurality of servers to connect to a specific sever in the plurality of servers, including:

a parameter acquisition step of acquiring a server parameter on each server of the plurality of servers;

an area name acquisition step of acquiring an area name of a location of the client terminal based on a connection request received from the client terminal;

a connection destination determination step of, when an area indicated by the area name belongs to a specific area, regarding one or more servers in the specific area in the plurality of servers to be candidates of the specific server, and determining the specific server from the one or more servers that are the candidates by using a server parameter acquired by the parameter acquisition step; and a connection destination instruction step of transmitting, to the client terminal, information of the specific server determined by the connection destination determination step.

Effect of the Present Invention

According to an embodiment of the present invention, it becomes possible to provide a technique that makes it possible to determine a proper server as a connection destination of a client terminal from a plurality of servers that provide services, and to cause the client terminal to connect to the proper server.

BRIEF DESCRIPTION OF THE DRAWINGS

FIG. 4 is a diagram showing an example of a score table;
FIG. 9A is a diagram showing an example of a parameter conversion table on the number of hops and arrival time;
FIG. 9B is a diagram showing an example of a parameter conversion table on the number of hops and arrival time;
FIG. 10A is a diagram showing an example of a parameter conversion table;
FIG. 10B is a diagram showing an example of a parameter conversion table;
FIG. 11A is a diagram showing an example of a parameter conversion table;
FIG. 11B is a diagram showing an example of a parameter conversion table;
FIG. 11C is a diagram showing an example of a parameter conversion table.

EMBODIMENTS FOR CARRYING OUT THE INVENTION

In the following, an embodiment of the present invention is described with reference to figures. Note that the embodiment described below is merely an example, and embodiments to which the present invention is applied are not limited to the following embodiment.

(System Whole Configuration)

Figure 1:
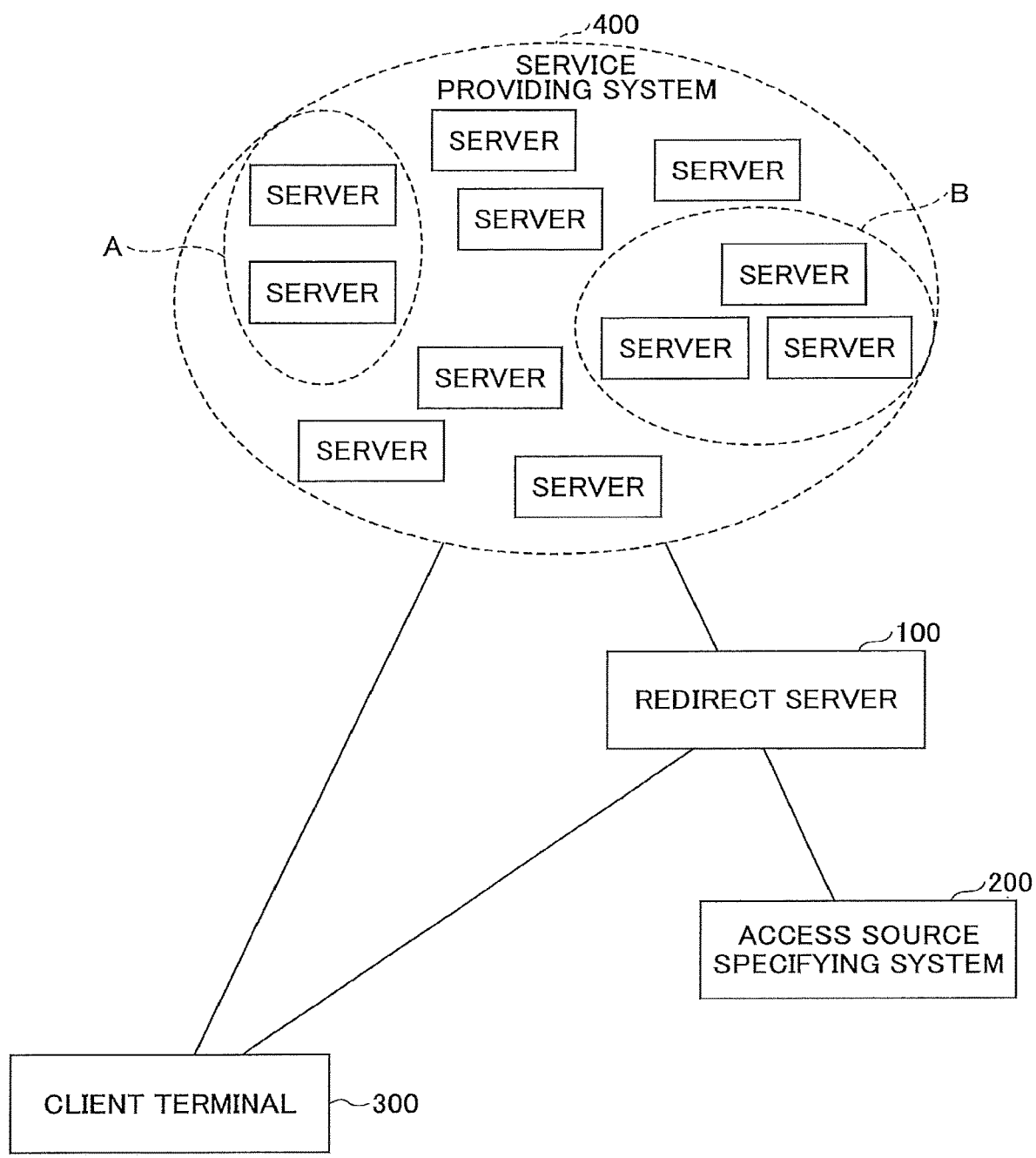
FIG. 1 is a system block diagram in an embodiment of the present invention.

FIG. 1 shows a whole configuration example of a system in an embodiment of the present invention. As shown in FIG. 1, the system of the present embodiment includes a redirect server 100, an access source specifying system 200, and a service providing system 400 including a plurality of servers that provide services. Also, as shown in FIG. 1, there is a client terminal 300 that uses the services provided by the service providing system 400. Since service utilization is performed by the client terminal 300 and the redirect server 100, a system including the client terminal 300 and the redirect server 100 may be referred to as a service use system. Also, the redirect server 100 may be referred to as a connection destination server instruction apparatus. Note that "A", "B" and the like in FIG. 1 indicate after-mentioned specific areas.

The redirect server 100, the access source specifying system 200, the client terminal 300, and each server forming the service providing system 400 are connected to a network, and they can perform communication at least in sections indicated by the straight lines in FIG. 1. Note that, to be able to perform communication in a section between the service providing system 400 and another apparatus means that communication is available between each server forming the service providing system 400 and another apparatus.

In the present embodiment, a network that enables communication between apparatuses is not limited to a specific type of network. For example, the network may be the Internet, a private network, or a network in which the Internet and the private network are mixed. Also, the network may be a radio network, a wired network, or a network in which the radio network and the wired network are coexist.

The service providing system 400 is assumed to be a system that provides the before-mentioned MSS (Managed Security Service), and a plurality of servers that form the service providing system 400 are placed at sites in the world in a distributed manner. However, this is merely an example, and the present invention can be applied irrespective of area unit where a plurality of servers are arranged. As an example, the present invention can be applied to a service providing system in which a plurality of servers are placed within one building and services are provided in the building.

In the service providing system 400 of the present embodiment, databases (DB) for providing services are centrally managed by a technique such as distributed DB and the like, so that the client terminal 300 can receive the same service irrespective of sites of servers that the client terminal 300 accesses. Therefore, a geographical area (example: country) where the client terminal 300 (user) exists and a geographical area where the site of the server that the client terminal 300 accesses exists may be different.

However, due to regulations on data protection such as EU data protection or security policies in various countries, for example, within the EU region, if data such as access logs must be stored in a server in the EU region, a distributed DB is constructed by servers within the EU region, and usages are assumed in which the connection destination of a client terminal existing in the EU region (specific area) is restricted within the EU region as described later.

The client terminal 300 is, for example, a PC, a smartphone, or the like on which a Web browser and the like is mounted. Upon receiving a connection request from the client terminal 300, the redirect server 100 selects a server as a connection destination of the client terminal 300 from a plurality of servers constituting the service providing system 400, and issues a connection instruction (redirect response) to the client terminal 300.

The access source specifying system 200 is a system that holds a database in which an IP address, a country, a city, an ISP, etc. are associated with each other, and the access source specifying system 200 receives an inquiry specifying a source IP address of the client terminal 300 from the redirect server 100 and can return a country name or the like (information indicating a geographical area) corresponding to the source IP address in response to the inquiry. The access source specifying system 200 can be realized by an existing technique such as GEOIP and Whois and the like.

In the present embodiment, by using the access source specifying system 200, the redirect server 100 determines (estimates) the geographical area of the location of the client terminal 300, however, the method for the redirect server 100 to determine the geographical area of the location of the client terminal 300 is not limited to this method, and the redirect server 100 may use any method for determining the geographical area of the location of the client terminal 300.

(Operation of the System)

Next, the whole operation of the system of the present embodiment is described with reference to the sequence diagram of FIG. 2.

Figure 2:
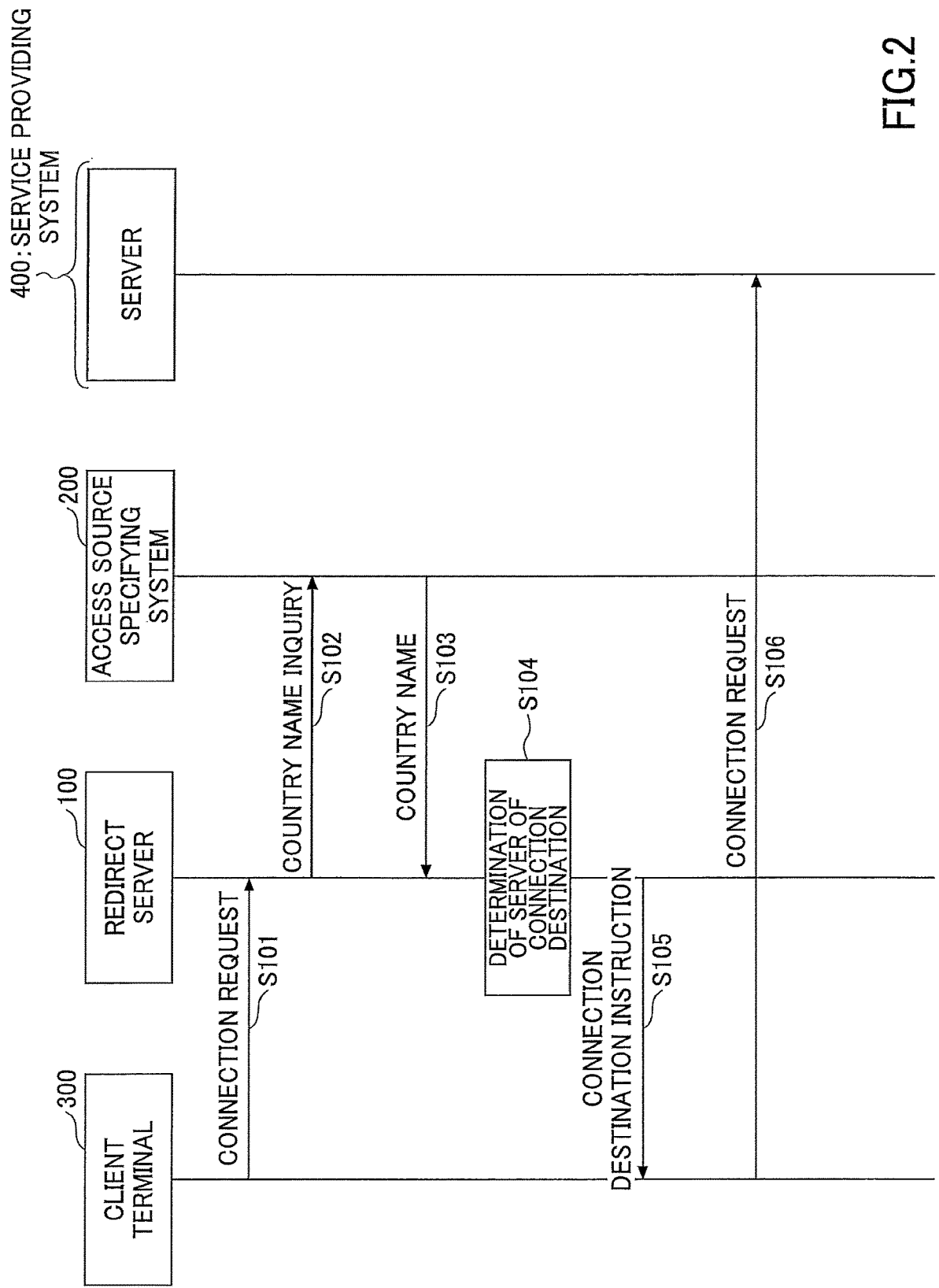
FIG. 2 is a sequence diagram for explaining the whole operation of the system.

As a premise of the operation of FIG. 2, for example, the redirect server 100 provides a screen of a comprehensive site, so that the client terminal 300 connects to the redirect server 100 first to display the screen, and requests use of a service (example: MSS) of the service providing system 400 from the menu of the screen. The connection request in step S101 in FIG. 2 corresponds to the request. However, such a premise is merely an example.

Also, it is assumed that the redirect server 100 collects various parameters used for determining a server that is a connection destination, and holds the parameters in a database that the redirect server 100 has (or a database outside of the redirect server 100). Details on the parameters are described later. The database also holds information (IP address of a server, URL and the like) used by the client terminal 300 for accessing the server.

As shown in FIG. 2, the client terminal 300 transmits, to the redirect server 100, a connection request (example: http request) for requesting connection to a server of the service providing system 400 (step S101).

The redirect server 100 that receives the connection request acquires an IP address of the transmission source of a packet including the connection request, and transmits, to the access source specifying system 200, a signal for inquiring information (which is a country name, as an example) of a geographical area corresponding to the IP address (step S102). The access source specifying system 200 that receives the inquiry returns a country name corresponding to the IP address to the redirect server 100 (step S103).

The redirect server 100 uses the country name (area name) acquired in step S103 as a name of a country (area) in which the client terminal 300 exists, and determines a server as a connection destination of the client terminal 300 based on the country name and parameters and the like held in the database (step S104).

The redirect server 100 transmits, to the client terminal 300, a connection destination instruction (example: http redirect response) including connection destination information (URL, IP address and the like of a server) for causing the client terminal 300 to connect to the server determined in step S104 (step S105). The client terminal 300 connects to the server designated by the redirect server 100 using the connection destination information included in the connection destination instruction (step S106).

(Connection Destination Determination Procedure)

Next, a process procedure for determining a connection destination executed by the redirect server 100 is described with reference to a flow chart shown in FIG. 3.

The redirect server 100 performs preprocessing for acquiring parameters such as load information of each server, load information of NW apparatuses connecting to a server, the number of hops between the client terminal 300 and each server and the like (step S201). Note that the procedure shown in FIG. 3 focuses on an access to a server by one client terminal 300, thus, the acquisition of the parameters is preprocessing for the access, but, as described later, acquisition of parameters may be executed at any time (periodically, for example).

When the redirect server 100 receives a connection request from the client terminal 300 (step S202), the redirect server 100 acquires a country name corresponding to the client terminal 300 from the access source specifying system 200 (step S203).

Next, the client terminal 300 creates a score table used for determining a connection destination of the client terminal 300 based on the country name of the location of the client terminal 300, various parameters stored in the database, and a parameter determination table for determining a score from a parameter and the like (step S204).

FIG. 4 shows an example of the score table. As shown in the left side of the score table, as parameters of evaluation targets in the score table, there are parameters on each server (to be referred to as server parameters) and parameters indicating correlation between the client terminal 300 and the server (to be referred to as terminal parameters). Note that parameters shown in FIG. 4 are examples.

As the server parameters, there are the number of connections indicating the number of client terminals to which the server is providing a service, CPU usage rate, memory usage rate, usage rate (example: traffic amount, CPU usage rate, port usage rate and the like) of NW apparatuses (switch, router and the like) to which the server is connected, server redundancy, server spec, regional risk and the like.

The server redundancy is, for example, the number of servers in the same site (example: same country), and the greater the number is, the higher the redundancy is. The server spec is, for example, CPU, memory, disk configuration, redundancy of power source and the like. The regional risk is a risk specific to the site, such as quality of server installation environment, preparation for disaster, possibility of occurrence of disaster, NW quality and the like, in a site (country, city, area and the like) where the server is placed.

In the above-mentioned server parameters, as to the number of connections, the CPU usage rate, the memory usage rate, the NW apparatus usage rate and the like, the redirect server 100 regularly acquires them from each apparatus and stores them in the database, for example. As to the server redundancy, the server spec, the regional risk and the like, the redirect server 100 stores them beforehand in the database of the redirect server 100, and updates them when there is a change. Also, as to the server redundancy, the server spec, the regional risk and the like, a score may be held as a parameter.

As terminal parameters, there are language information of a browser used in the client terminal 300, a distance between the client terminal 300 and the server, the number of hops (the number of routers to be passed through) between the client terminal 300 and the server, availability of cross-border and the like. Note that arrival time of a packet from the client terminal 300 to the server may be used as a terminal parameter in addition to the number of hops between the client terminal 300 and the server.

As to the language information of the browser, the redirect server 100 can acquire it from the connection request (http request) received from the client terminal 300.

As to the distance between the client terminal 300 and the server, for example, the redirect server 100 can determine it from a country name that is acquired when receiving an access from the client terminal 300 and a country name of the server. In this determination, a distance between locations may be calculated by determining specific locations in countries, or, a distance may be calculated for each combination of countries and stored in a table beforehand, so that a distance may be acquired from the table. Also, a score of distance may be determined for each combination of countries and the score may be held.

As to the number of hops and the arrival time, for example, the client terminal 300 acquires them by using a command such as traceroute and the like for each server, and reports the acquired number of hops/arrival time to the redirect server 100. Methods for acquiring the number of hops and the arrival time are not limited to specific methods, and for example, it may be possible to install, in the client terminal 300 and the server, a program for acquiring the number of hops and the arrival time so as to acquire the number of hops and the arrival time by the program.

The information of availability of cross-border is information specific to an area (country, region and the like) to which the server belongs, and the information is, for example, information indicating whether there is legal restriction in taking data, managed within a specific area (example: within the EC area), out of the specific area. Also, in addition to such legal restriction, the "availability of cross-border" of the present embodiment includes information determined by a service operator. This is, for example, information indicating that the connection destination of the client terminal 300 in Japan is restricted to servers in Japan. Information of availability of cross-border is stored in a database for each server.

Note that it is not essential to use all the parameters shown in FIG. 4. Since a distance to a server can be determined from a country name of the client terminal 300, terminal parameters such as the number of hops and the arrival time may not be used, for example.

As shown in FIG. 4, for each parameter, scores for each server are determined for the client terminal 300 that transmits the connection request and the scores are written in a score table. In the present embodiment, a server is indicated by the country name of the site and a number of the server (in the case in which there are a plurality of servers).

A score for a parameter is determined by a parameter determination table held in the database. Note that, in the example of FIG. 4, as to cross-border availability, ○ is indicated to a server that exists in an area where cross-border is available, and for a server that exists in an area where cross-border is unavailable, a group number that indicates an area range where access is restricted is shown. For example, Group 2 is described for German servers DE 1 and DE 2 and Group 1 is described for a Japanese server JP. This means that connection destination of a client terminal 300 in Germany is restricted to DE 1 and DE 2, and connection destination of a client terminal 300 in Japan is restricted to JP.

Figure 3:
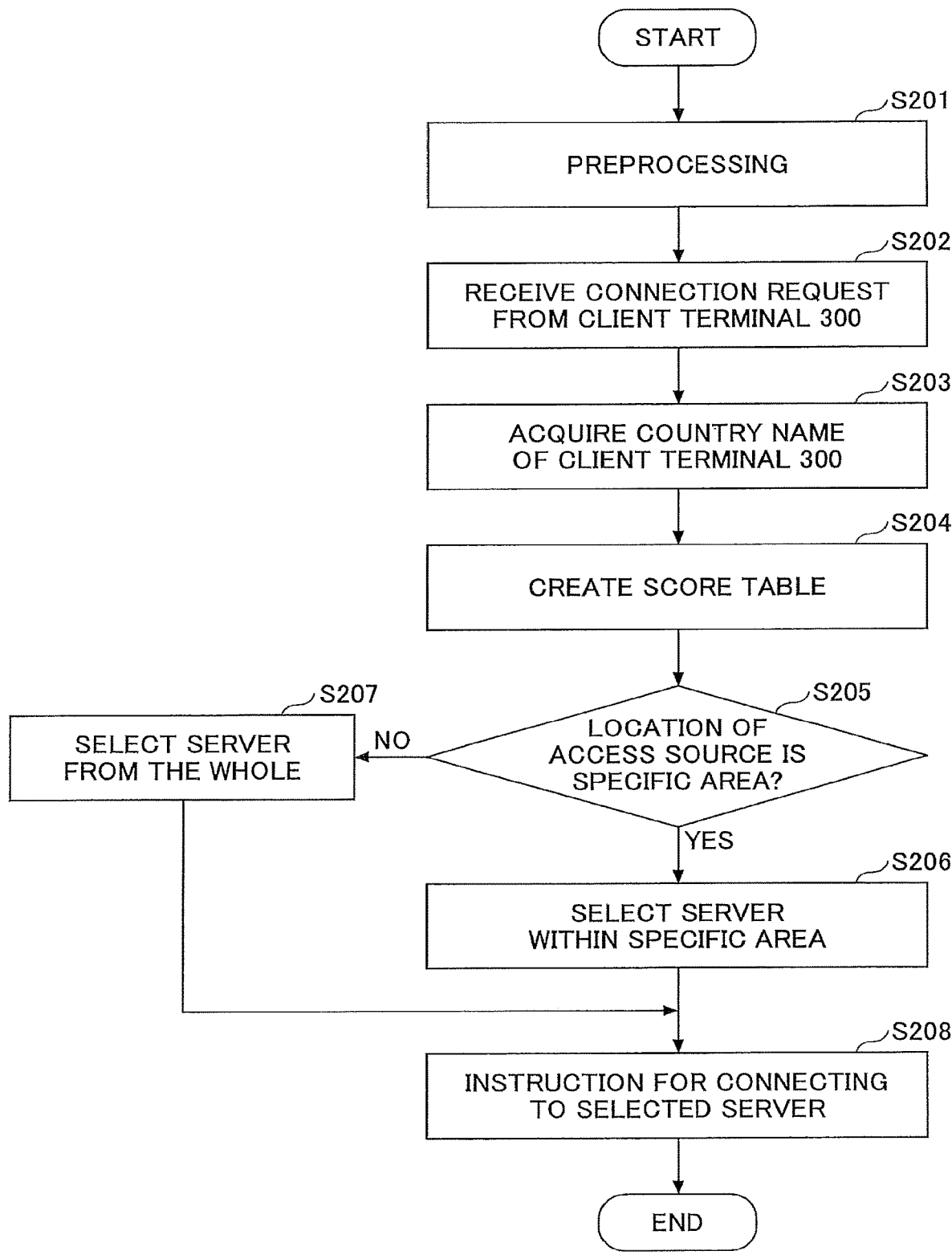
FIG. 3 is a flowchart for explaining a procedure of connection destination determination processing by the redirect server 100.

In creating the score table in step S204 of FIG. 3, a score (for example, a score such as the CPU usage rate of a server) that can be determined without depending on the country name of the client terminal 300 is determined before receiving the connection request from the client terminal 300, and the score is entered in the score table. With respect to a score (for example, a core of distance) determined depending on the country name of the client terminal 300, the score is determined after receiving the connection request, and the score is entered in the score table. Of course, it is also possible to determine all the scores and enter them in the score table after receiving the connection request.

In step S205 of FIG. 3, the redirect server 100 determines whether the area (country name) of the location of the access source client terminal 300 belongs to a specific area (step S205). The "specific area" in the present embodiment is an area where cross-border is unavailable.

In the present embodiment, for example, it is determined that countries within the EU region belong to the "specific area". Also, in this embodiment, it is determined that Japan belongs to the "specific area" because there is a strong need, in Japan, for accessing domestic servers and managing data in Japan. Also, for a country other than Japan, if there is a need similar to Japan, it is determined that the country belongs to the "specific area". Note that, as to which countries (or one country) the "specific area" includes, it can be identified by the Group number in the score table.

Figures 5, 6:
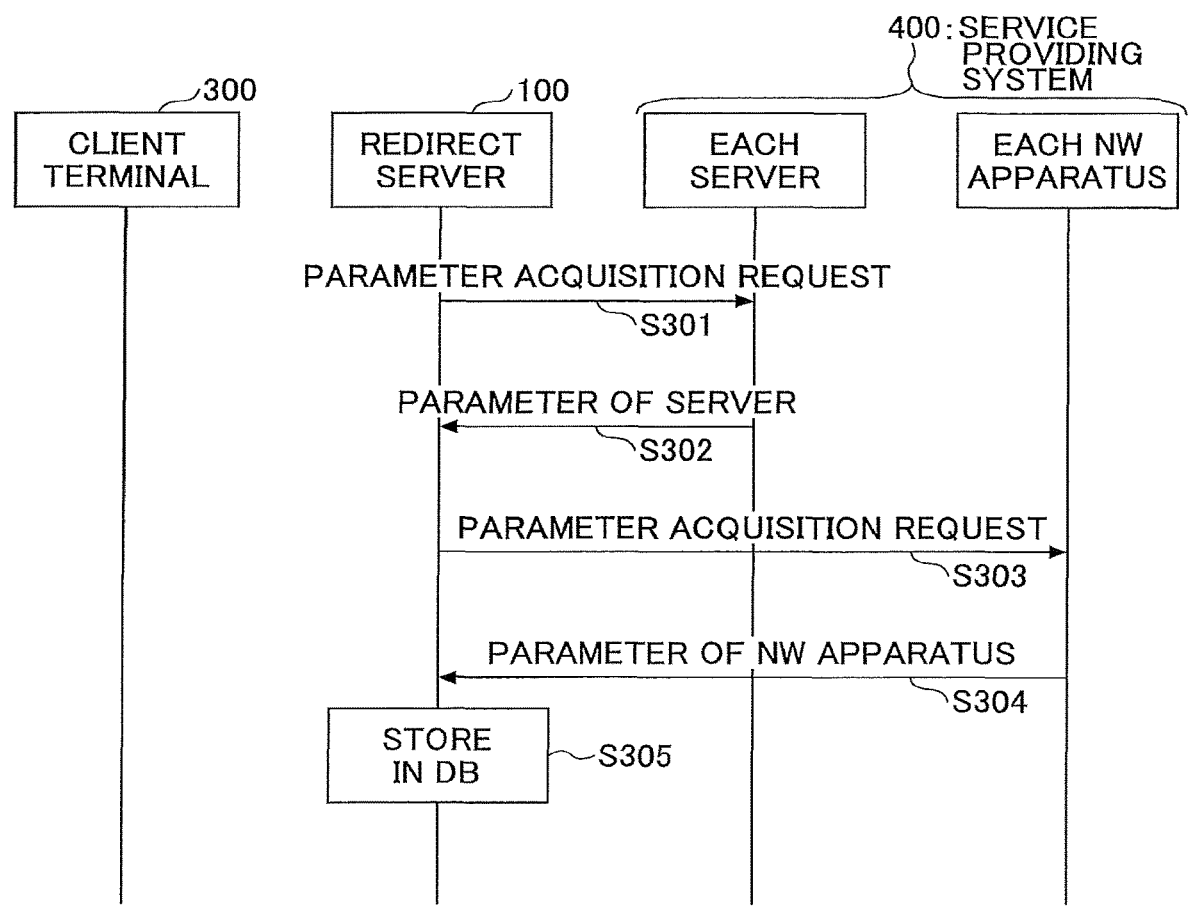
FIG. 5 is a diagram for explaining an example when selecting a server within a specific area.
FIG. 6 is a diagram for explaining a process example 1 for acquiring a parameter.

Regarding determination of belonging or not to the "specific area", it may be determined by referring to the score table, or the table shown in FIG. 5 may be prepared in a database and, it may be determined by referring to the table.

The table shown in FIG. 5 is a table showing, for each country corresponding to the "specific area", a target country (a country included in the specific area) to which the client terminal 300 of the country can connect, and servers in the target country.

In the example of FIG. 5, when a country of a client terminal 300 of an access source is the United Kingdom (UK), a country of a server that becomes a connection destination of the client terminal 300 is limited to Germany and UK, and a server of the connection destination is selected from DE 1, 2, 3, and UK 1, 2, 3.

When the location is determined to be a "specific area" in step S205, the process goes to step S206, and when the location is not determined to be a "specific area", the process goes to step S207.

In step S206 in which the location is determined to be a "specific area", the redirect server 100 selects a server to which the client terminal 300 is caused to connect from a server group within the specific area. For example, for the case of the example of the above-mentioned UK, the redirect server 100 selects a server from a server group (DE1, 2, 3, UK1, 2, 3) within the specific area (Germany, UK).

In step S207 in which the location is not determined to be a "specific area", the redirect server 100 selects a server from the whole server groups.

In steps S206 and S207, the redirect server 100 refers to the score table (example: FIG. 4), adds scores for all parameters having scores for each server in a server group in a selection range, and selects a server for which the score is the smallest. Note that, in the present embodiment, a server with the smallest score is selected since the score calculation method in which the score becomes large when the server is not suitable for accessing is adopted, however, this is merely an example. A server for which the score is the largest may be selected by adopting a score assigning method in which the score becomes large when the server is suitable for accessing.

As an example, in the example of FIG. 4, when the country of the client terminal 300 is SG (Singapore), since SG is cross-border available, a server is selected from the whole server groups. Then, in the case of FIG. 4, since the server/NW of SG is tight, the score of the server/NW is high. Therefore, even when the location of the client terminal 300 is SG, as a result, a server of JP having the smallest sum of scores is selected (surrounded by a frame indicated by A in FIG. 4).

Note that when the server group in a specific area is one server, the determination based on the score may not be performed, or may be performed. When the server group in the specific area is one server and determination based on the score is performed, for example, when the score is very bad (when the connection to the server is not appropriate), it is possible to return a message that prohibits the client terminal 300 from connecting to the server, or select a server in another area.

Also, in the present embodiment, as shown in FIG. 4, scores are processed in a table format, however, the table format is an example. It is not necessary to use the table format if any processing method that can calculate the score is adopted.

In step S208 of FIG. 3, the redirect server 100 instructs the client terminal 300 to connect to the selected server.

(As to Parameter and Score)

In the following, acquisition of parameters and conversion to scores are described in more detail.

FIG. 6 is a sequence diagram showing an example of processing for acquiring a server parameter. As show in FIG. 6, the redirect server 100 transmits a parameter acquisition request to each server (step S301) and acquires parameters (number of connections, CPU usage rate, memory usage rate, and the like) from each server (step S302), and the redirect server 100 transmits a parameter acquisition request to each NW apparatus (step S303) to acquire parameters from each NW apparatus (step S304). The acquired parameters are stored in the database (step S305).

The above-mentioned parameter acquisition can be executed by using an SNMP protocol, for example. Also, the parameter acquisition is executed periodically, for example.

Figures 7, 8:
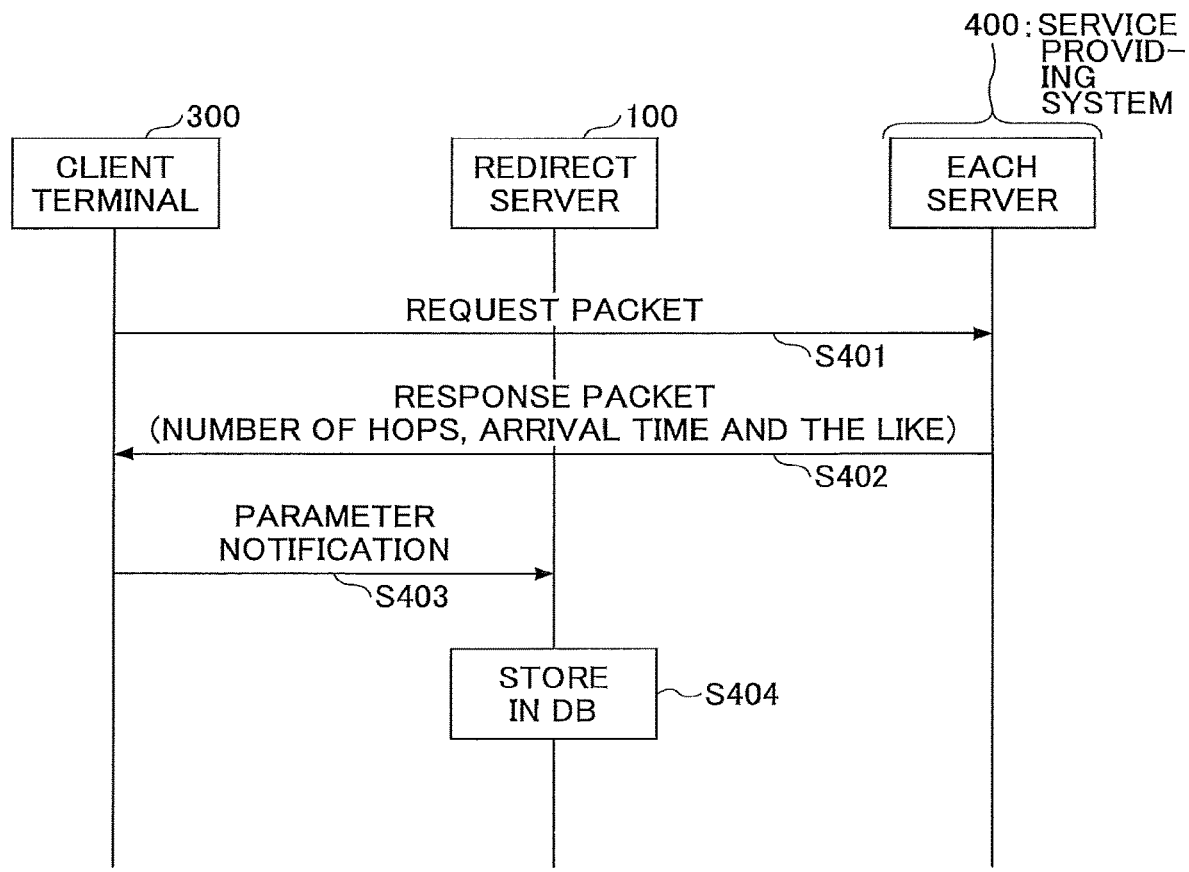
FIG. 7 is a diagram showing an example of a parameter determination table for converting a server parameter to a score.
FIG. 8 is a diagram for explaining a process example 2 for acquiring a parameter.

The redirect server 100 calculates a score corresponding to an acquired parameter by referring to a parameter determination table as shown in FIG. 7, for example, and stores the score in the database. The parameter determination table is a table which is set in advance in the database.

In the example shown in FIG. 7, for example, when the number of connections "10" is acquired as a parameter of a server, the score corresponding to the parameter of the server is "50".

FIG. 8 is a sequence diagram showing an example of processing for acquiring terminal parameters. As shown in FIG. 8, a request packet for parameter acquisition is transmitted to each server (step S401), and a response packet is received from each server (step S402). For example, the response packet includes the number of hops (the number of routers passing through) of a route from the client terminal 300 to the server, and includes an arrival time until the request packet arrives at the server from the client terminal 300.

In the present embodiment, by installing a program for executing the processing for acquiring the parameters in the client terminal 300, the above processing can be realized. Also, the number of hops, the arrival time, and the like may be acquired using functions, such as traceroute, generally provided in the server or the client terminal 300.

The client terminal 300 that acquired the terminal parameter in step S402 notifies the redirect server 100 of the parameter (step S 403). The redirect server 100 stores the parameter received from the client terminal 300 in the database together with information (example: IP address) that can identify the client terminal 300 (step S404).

The above processing may be performed periodically or at the timing when the client terminal 300 transmits a connection request to the redirect server 100. That is, for example, when an operation for transmitting a connection request is performed to the client terminal 300 by the user, the client terminal 300 acquires the terminal parameter and transmits the acquired terminal parameter and the connection request to the redirect server 100.

The redirect server 100 calculates a score corresponding to the acquired parameter by referring to a parameter determination table as shown in FIGS. 9A and 9B, for example, and stores the score in the database. The parameter determination table is a table which is set in advance in the database.

In the example shown in FIG. 9A, for example, when the number of hops "7" is acquired as a parameter of the client terminal 300 for a certain server, the score corresponding to the parameter of the server is "100". In the example shown in FIG. 9B, for example, when an arrival time "50 ms" is acquired as a parameter of the client terminal 300 for a certain server, the score corresponding to the parameter of the server is "50".

In the following, examples of parameters determination tables are further described.

FIG. 10A is an example of a parameter determination table in which parameters of browser language information, which is one of the terminal parameters, and scores are associated with each other. In FIG. 10A, parameters of the browser language information are shown as JP, CN, and the like, and, for each parameter, scores are shown for each server site. Note that FIG. 10A shows a part of sites. For example, when the language used by the browser is CN (Chinese), the score for a server in Singapore (SG) is 100.

FIG. 10B is an example of a parameter determination table in which parameters of distance which is one of terminal parameters, and scores are associated with each other. In FIG. 10B, country names are shown as distances. Note that FIG. 10B shows a part of sites. For example, when the distance is "JP", the score for a server whose location is CN (Chinese) is 100.

FIG. 11A is an example of a parameter determination table for server redundancy. Since the server redundancy is basically statically determined, in this example, server redundancy is recorded as a score directly so that the parameter determination table is made. For example, the score of the server "UK" is 50.

FIG. 11B is an example of a parameter determination table for server specs. Since server specs are also basically statically determined, also in this example, server specs are recorded directly as scores so that the parameter determination table is made. For example, the score of the server "UK" is 100.

FIG. 11C is an example of a parameter determination table for regional risks. Since regional risks are also basically statically determined, also in this example, regional risks are recorded directly as scores so that the parameter determination table is made. For example, the score of the server "UK" is 50.

Each of the above scores is basically statically determined, however, there are quite a few cases where scores change, so they are periodically checked, and when there is a difference from a present state, update is performed.

(Apparatus Configuration)

<Redirect Server 100>

Figure 12:
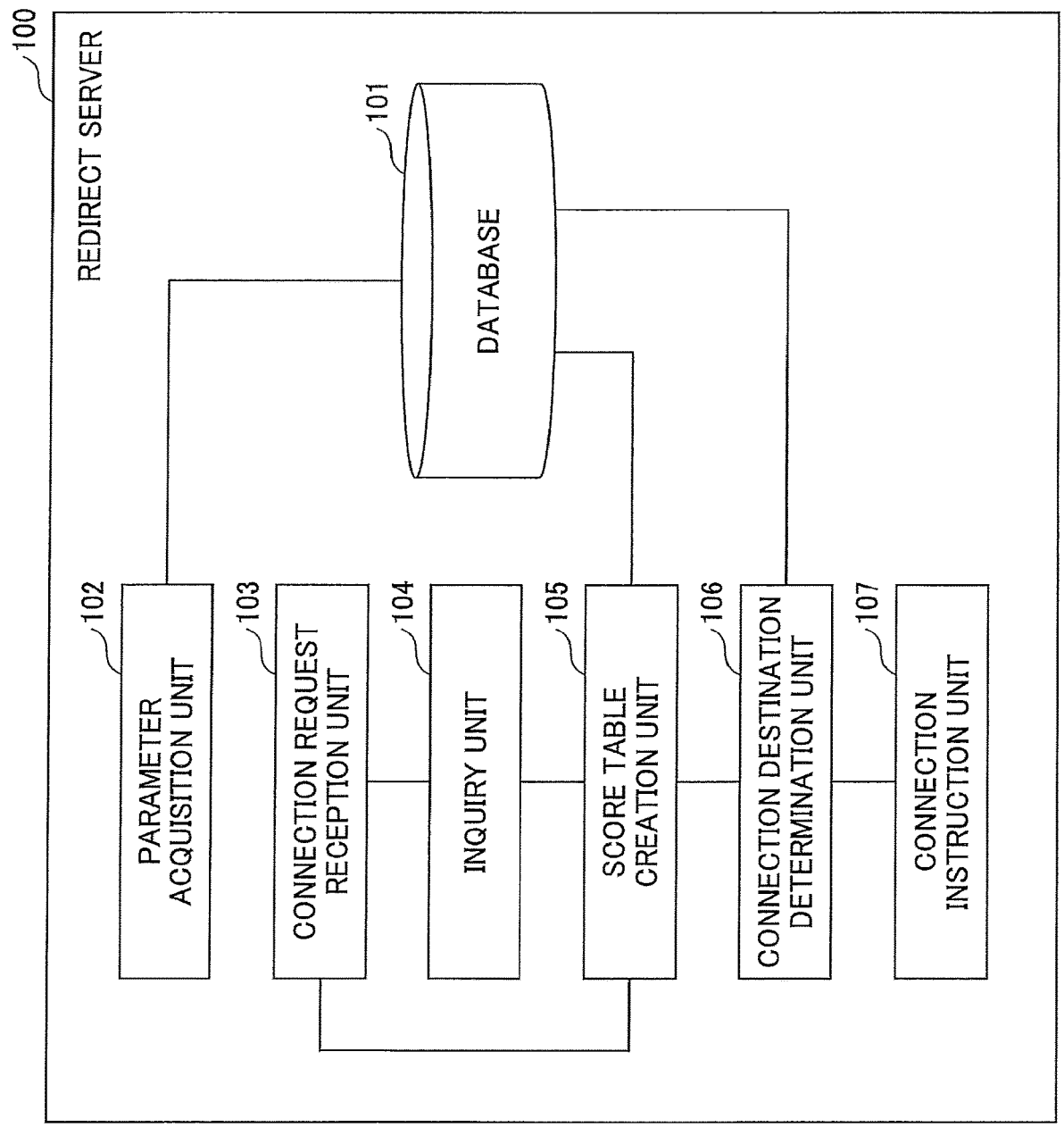
FIG. 12 is a block diagram of a redirect server 100.

FIG. 12 shows a configuration example of the redirect server 100 that can execute processing described so far.

As shown in FIG. 12, the redirect server 100 includes a database 101, a parameter acquisition unit 102, a connection request reception unit 103, an inquiry unit 104, a score table creation unit 105, a connection destination determination unit 106, and a connection instruction unit 107.

The database 101 stores information necessary for the redirect server 100 to select a server to which the client terminal 300 is caused to connect, such as the various parameters, the score table, the parameter determination tables, and the like described so far. Note that the database 100 may be provided outside of the redirect server 100.

The parameter acquisition unit 102 acquires server parameters from servers/NW apparatuses, receives terminal parameters such as the number of hops and the like from the client terminal 300, and stores them in the database 101. When storing them in the database 101, a parameter that can be converted to a score (a parameter whose score is determined without depending on the location of the client terminal 300, and the like) may be stored after conversion into a score. Also, scores may be stored in a format in which part of the score table is filled.

When receiving a connection request from the client terminal 300, the connection request reception unit 103 passes an IP address of the transmission source to the inquiry unit 104 to request acquisition of the country name. The inquiry unit 104 inquires the access source specifying system 200 about the country name corresponding to the IP address of the transmission source of the connection request and acquires the country name.

The score table creation unit 105 creates a score table (example: FIG. 4) from the location (country name) of the client terminal 300, parameters acquired from servers/NW apparatuses, parameters acquired from the client terminal 300, static parameters, the parameter conversion tables and the like. For example, in the example of FIG. 4, before receiving a connection request from the client terminal 300, the score table creation unit 105 creates a score table in which scores related to server parameters determined without depending on the location of the client terminal 300 and information on cross-border availability (○, Group number, and the like) are filled. Then, when receiving a connection request from the client terminal 300, the score table is completed by writing scores on terminal parameters such as the browser language information, the distance, the number of hops and the like for the client terminal 300 into the score table, and stores it in the database 101.

The connection destination determination unit 106 determines a server as a connection destination of the client terminal 300 based on the score table created by the score table creation unit 105. The connection instruction unit 107 transmits, to the client terminal 300, a connection destination instruction for causing the client terminal 300 that is a transmission source of the connection request to connect to a sever determined by the connection destination determination unit 106.

The functions of the redirect server 100 shown in FIG. 12 are shown as main functions. Also, functional divisions shown in FIG. 12 are merely examples, and functional divisions are not limited to functional divisions shown in FIG. 12 as long as processes described in the present embodiment can be performed.

The redirect server 100 of the present embodiment can be realized by causing one or a plurality of computers to execute a program that describes the process content described in the present embodiment. More specifically, the function of the redirect server 100 can be realized by executing a program corresponding to processes performed by the redirect server 100 by using hardware resources such as a processor like a CPU, a memory and a hard disk and the like in the computer. The program can be saved and distributed by recording the program in a computer readable recording medium (such as portable memory). Also, the program can be provided via a network such as the Internet, an electronic mail and the like.

Also, each unit forming the redirect server 100 may be formed by hardware circuits.

<Client Terminal 300>

Figure 13:
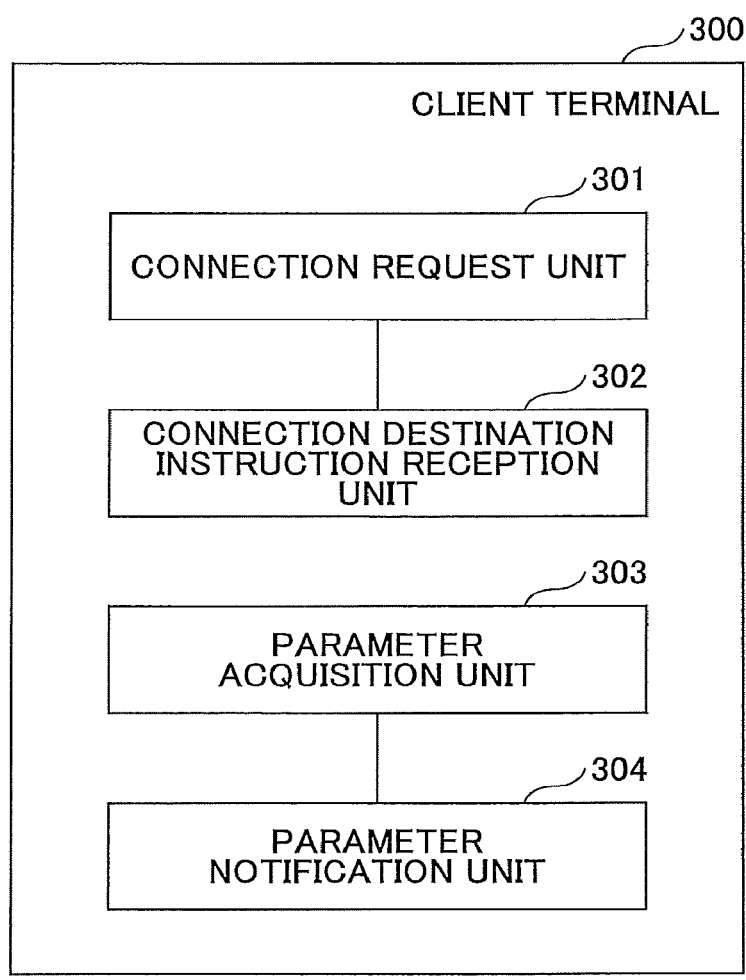
FIG. 13 is a block diagram of a client terminal 300.

FIG. 13 is a configuration example of the client terminal 300 that can execute processing described so far.

As shown in FIG. 13, the client terminal 300 includes a connection request unit 301, a connection destination instruction reception unit 302, a parameter acquisition unit 303, and a parameter notification unit 304. The connection request unit 301 transmits a connection request to the redirect server 100 based on, for example, an operation by a user, and executes connection to a server based on a connection destination instruction received by the connection destination instruction reception unit 302. The connection destination instruction reception unit 302, receives from the redirect server 100, a connection destination instruction instructing connection to the server determined by the redirect server 100.

In the present embodiment, it is assumed that connection requests and services are utilized on a Web basis, and the connection request unit 301 and the connection destination instruction reception unit 302 can be realized by a Web browser provided in the client terminal 300.

The parameter acquisition unit 303 transmits a request packet for a terminal parameter to each server periodically or when the connection request unit 301 is instructed to connect to the redirect server 100, so that the parameter acquisition unit 303 acquires terminal parameters (the number of hops, arrival time, and the like) related to each server. The parameter notification unit 304 transmits the terminal parameters acquired by the parameter acquisition unit 303 to the redirect server 100. For example, the parameter notification unit 304 is realized as an agent in the client terminal 300.

The functions of the client terminal 300 shown in FIG. 13 are shown as main functions. Also, functional divisions shown in FIG. 13 are merely examples, and functional divisions are not limited to functional divisions shown in FIG. 13 as long as processes described in the present embodiment can be performed.

The client terminal 300 of the present embodiment can be realized by causing a terminal, such as a PC and a smartphone, including a function of a computer to execute a program that describes the process content described in the present embodiment. More specifically, the function of the client terminal 300 can be realized by executing a program corresponding to processes performed by the client terminal 300 by using hardware resources such as a processor like a CPU, a memory and a hard disk and the like in the computer. The program can be saved and distributed by recording the program in a computer readable recording medium (such as portable memory). Also, the program can be provided via a network such as the Internet, an electronic mail and the like.

Also, each unit forming the client terminal 300 may be formed by hardware circuits.

SUMMARY OF EMBODIMENT

According to the present embodiment, there is provided a connection destination server instruction apparatus for causing a client terminal that uses a service of a service providing system including a plurality of servers to connect to a specific sever in the plurality of servers, including:

parameter acquisition means configured to acquire a server parameter on each server of the plurality of servers;

area name acquisition means configured to acquire an area name of a location of the client terminal based on a connection request received from the client terminal;

connection destination determination means configured, when an area indicated by the area name belongs to a specific area, to regard one or more servers placed in the specific area in the plurality of servers to be candidates of the specific server, and to determine the specific server from the one or more servers that are the candidates by using the server parameter acquired by the parameter acquisition means; and connection destination instruction means configured to transmit, to the client terminal, information of the specific server determined by the connection destination determination means.

When the area indicated by the area name does not belong to the specific area, the connection destination determination means may regard all servers forming the service providing system to be candidates of the specific server.

The parameter acquisition means may acquire, from the client terminal, a terminal parameter that is information on a route between the client terminal and each server, and the connection destination determination means may determine the specific server from the one or more servers that are the candidates by using the server parameter and the terminal parameter.

The connection destination determination means may obtain a score corresponding to each parameter acquired by the parameter acquisition means for each of the plurality of servers forming the service providing system, and determine the specific server based on a sum of scores on each server.

According to the present embodiment, there is provided a service use system including a connection destination server instruction apparatus for causing a client terminal that uses a service of a service providing system including a plurality of servers to connect to a specific sever in the plurality of servers, and the client terminal, the client terminal including:

terminal parameter acquisition means configured to acquire a terminal parameter that is information on a route between the client terminal and each server; and parameter notification means configured to notify the connection destination server instruction apparatus of the terminal parameter, the connection destination server instruction apparatus including:

parameter acquisition means configured to acquire a server parameter on each server of the plurality of servers, and the terminal parameter;

area name acquisition means configured to acquire an area name of a location of the client terminal based on a connection request received from the client terminal;

connection destination determination means configured, when an area indicated by the area name belongs to a specific area, to regard one or more servers placed in the specific area in the plurality of servers to be candidates of the specific server, and to determine the specific server from the one or more servers that are the candidates by using the server parameter and the terminal parameter acquired by the parameter acquisition means; and connection destination instruction means configured to transmit, to the client terminal, information of the specific server determined by the connection destination determination means.

Also, according to the present embodiment, there is provided a client terminal in a service use system including a connection destination server instruction apparatus for causing a client terminal that uses a service of a service providing system including a plurality of servers to connect to a specific sever in the plurality of servers, and the client terminal, including terminal parameter acquisition means configured to acquire a terminal parameter that is information on a route between the client terminal and each server;

parameter notification means configured to notify the connection destination server instruction apparatus of the terminal parameter;

connection request means configured to transmit a connection request to the connection destination server instruction apparatus; and reception means configured to receive information of the specific server that is determined from the plurality of servers by using the terminal parameter in the connection destination server instruction apparatus that receives the connection request.

The redirect server 100 is an example of the connection destination server instruction apparatus. The parameter acquisition unit 102 is an example of the parameter acquisition means. The connection request reception unit 103 and the inquiry unit 104 are examples of the area name acquisition means. Also, the connection destination determination unit 106 is an example of the connection destination determination means, and the connection instruction unit 107 is an example of the connection destination instruction means. Note that, parameter acquisition means, area name acquisition means, connection destination determination means and connection destination instruction means of the connection destination server instruction apparatus may be replaced with a parameter acquisition unit, an area name acquisition unit, a connection destination determination unit and a connection destination instruction unit respectively.

Also, the client terminal 300 is an example of the client terminal. The parameter acquisition unit 303 is an example of the terminal parameter acquisition means, and the parameter notification unit 304 is an example of the parameter notification means. The connection request unit 301 is an example of the connection request means, and the connection destination instruction reception unit 302 is an example of the connection destination instruction reception means. Note that, terminal parameter acquisition means, parameter notification means, connection request means, and reception means in the client terminal may be replaced with a terminal parameter acquisition unit, a parameter notification unit, a connection request unit, and a reception unit respectively.

(On Effects of the Embodiment)

In the prior art, since a user directly designates a connection destination to access a server, accesses may be concentrated to a server of one site so that it becomes difficult to continue services. Also, circuit load and server load may increase, so that there may be a case in which unexpected additional investment which is different from initial schedule becomes necessary.

According to the technique of the present embodiment, it becomes possible to solve the above problem, and to select a connection destination server appropriately to cause the user to connect to the server.

Also, as represented by EU data protection, it is necessary to respond to needs such as restriction of cross-border transfer of security monitoring logs (personal access logs, and the like) and restriction of country from which the logs can be accessed. So, according to the technique of the present embodiment, it becomes possible to deal with such restrictions and needs.

The field of application of the technique according to the present embodiment is not limited to a specific field. However, in the present embodiment, as an example, the application target is a system for providing managed security services distributed at global sites. By applying the present technology to such a system for providing the managed security services, it becomes possible that a user can connect to an optimal server even if there are restricting conditions in which, for example, a storing destination of data is restricted to a domestic specific server, and a server of access destination is restricted to a domestic specific server. In addition, even if the number of servers to be added is limited in the system, it is possible to avoid congestion without adding additional facilities. Furthermore, even in situations where quality of each server varies, it is possible to provide the services with the optimum quality to users.

The present invention is not limited to the specifically disclosed embodiment, and variations and modifications may be made without departing from the scope of the claims.

The present patent application claims priority based on Japanese patent application No. 2015-106718, filed in the JPO on May 26, 2015, and the entire contents of the Japanese patent application No. 2015-106718 are incorporated herein by reference.

DESCRIPTION OF REFERENCE SIGNS 100 redirect server
101 database
102 parameter acquisition unit
103 connection request reception unit
104 inquiry unit
105 score table creation unit
106 connection destination determination unit
107 connection instruction unit
200 access source specifying system
300 client terminal
301 connection request unit
302 connection destination instruction reception unit
303 parameter acquisition unit
304 parameter notification unit
400 service providing system

The invention claimed is:

1. A connection destination server instruction apparatus for causing a client terminal that uses a service of a service providing system including a plurality of servers to connect to a specific sever in the plurality of servers, comprising:
circuitry including at least a processor and a memory coupled to the processor, the circuitry being configured to:
acquire a server parameter on each server of the plurality of servers;
acquire an area name of a location of the client terminal based on a connection request received from the client terminal;
when an area indicated by the area name belongs to a specific area, regard one or more servers placed in the specific area in the plurality of servers to be candidates of the specific server, and determine the specific server from the one or more servers that are the candidates by using the server parameter acquired; and
transmit, to the client terminal, information of the specific server determined by the circuitry,
wherein the circuitry converts each of a plurality of server parameters including regional risk to a score, and determines the specific server based on a sum of scores, and
wherein a score of the regional risk is updated when there is a change based on a periodic checking.

2. The connection destination server instruction apparatus as claimed in claim 1, wherein, when the area indicated by the area name does not belong to the specific area, the circuitry regards all servers forming the service providing system to be candidates of the specific server.

3. The connection destination server instruction apparatus as claimed in claim 1, wherein the circuitry acquires, from the client terminal, a terminal parameter that is information on a route between the client terminal and each server, and
the circuitry determines the specific server from the one or more servers that are the candidates by using the server parameter and the terminal parameter.

4. A service use system including a connection destination server instruction apparatus for causing a client terminal that uses a service of a service providing system including a plurality of servers to connect to a specific sever in the plurality of servers, and the client terminal,
the client terminal comprising circuitry including at least a processor and a memory coupled to the processor, the circuitry being configured to:
acquire a terminal parameter that is information on a route between the client terminal and each server; and
notify the connection destination server instruction apparatus of the terminal parameter,
the connection destination server instruction apparatus comprising circuitry including at least a processor and a memory coupled to the processor, the circuitry being configured to:
acquire a server parameter on each server of the plurality of servers, and the terminal parameter;
acquire an area name of a location of the client terminal based on a connection request received from the client terminal;
when an area indicated by the area name belongs to a specific area, regard one or more servers placed in the specific area in the plurality of servers to be candidates of the specific server, and determine the specific server from the one or more servers that are the candidates by using the server parameter and the terminal parameter acquired; and
transmit, to the client terminal, information of the specific server determined by the circuitry,
wherein the circuitry converts the terminal parameter to a score, converts each of a plurality of server parameters including regional risk to a score, and determines the specific server based on a sum of scores, and
wherein a score of the regional risk is updated when there is a change based on periodic checking.

5. A connection destination server instruction method executed by a connection destination server instruction apparatus for causing a client terminal that uses a service of a service providing system including a plurality of servers to connect to a specific sever in the plurality of servers, comprising:
acquiring, with circuitry, a server parameter on each server of the plurality of servers;
acquiring, with the circuitry, an area name of a location of the client terminal based on a connection request received from the client terminal;
when an area indicated by the area name belongs to a specific area, regarding, with the circuitry, one or more servers in the specific area in the plurality of servers to be candidates of the specific server, and determining the specific server from the one or more servers that are the candidates by using a server parameter acquired; and
transmitting, with the circuitry and to the client terminal, information of the specific server determined, wherein, in the transmitting, each of a plurality of server parameters including regional risk are converted to a score, and the specific server is determined based on a sum of scores, and wherein a score of the regional risk is updated when there is a change based on periodic checking.

6. A non-transitory computer-readable medium encoded with computer-readable instructions thereon that, when executed by a computer, cause the computer to perform the method according to claim 5.

* * * * *